(12) United States Patent
Kato et al.

(10) Patent No.: US 10,211,474 B2
(45) Date of Patent: Feb. 19, 2019

(54) REDOX FLOW SECONDARY BATTERY AND ELECTROLYTE MEMBRANE FOR REDOX FLOW SECONDARY BATTERY

(71) Applicant: ASAHI KASEI KABUSHIKI KAISHA, Tokyo (JP)

(72) Inventors: Akihiro Kato, Tokyo (JP); Naoto Miyake, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/617,676

(22) Filed: Jun. 8, 2017

(65) Prior Publication Data

US 2017/0271698 A1    Sep. 21, 2017

Related U.S. Application Data

(62) Division of application No. 14/368,017, filed as application No. PCT/JP2012/083950 on Dec. 27, 2012.

(30) Foreign Application Priority Data

Dec. 28, 2011    (JP) ................................. 2011-290033

(51) Int. Cl.
*H01M 8/1039* (2016.01)
*H01M 8/1023* (2016.01)
(Continued)

(52) U.S. Cl.
CPC ....... *H01M 8/1039* (2013.01); *H01M 8/1023* (2013.01); *H01M 8/188* (2013.01);
(Continued)

(58) Field of Classification Search
CPC .. H01M 8/1039; H01M 8/1023; H01M 8/188; H01M 8/20
See application file for complete search history.

(56) References Cited

U.S. PATENT DOCUMENTS

| 4,421,579 A | 12/1983 | Covitch et al. |
| 5,759,711 A | 6/1998 | Miyabayashi |
| (Continued) | | |

FOREIGN PATENT DOCUMENTS

| JP | 53-141187 | 12/1978 |
| JP | 58-6988 | 1/1983 |
| (Continued) | | |

OTHER PUBLICATIONS

Miyabayashi et al., JP 112603990 English Translation, Translated via JPO on Dec. 7, 2017, first published Sep. 24, 1999.*

(Continued)

*Primary Examiner* — Jimmy Vo
(74) *Attorney, Agent, or Firm* — Greenblum & Bernstein, P.L.C.

(57) ABSTRACT

The problem addressed by the present invention is to obtain an electrolyte membrane that, as an electrolyte membrane for a redox flow secondary battery, is able to suppress the ion permeability of an active substance without detracting from proton (H+) permeability, has superior ion-selective permeability, has low electrical resistivity, and has superior current efficiency. The present invention solves the abovementioned problem by means of the electrolyte membrane for a redox flow secondary battery containing a perfluorocarbon sulfonic acid resin having a specific structure and an equivalent weight (EW), and the ion conductivity being adjusted to a predetermined range.

7 Claims, 1 Drawing Sheet

(51) Int. Cl.
    *H01M 8/18*     (2006.01)
    *H01M 8/20*     (2006.01)
    *H01M 8/1018*   (2016.01)

(52) U.S. Cl.
    CPC ...... *H01M 8/20* (2013.01); *H01M 2008/1095* (2013.01); *H01M 2300/0082* (2013.01); *Y02E 60/528* (2013.01)

(56) References Cited

U.S. PATENT DOCUMENTS

| | | |
|---|---|---|
| 6,461,772 B1 | 10/2002 | Shinichi et al. |
| 2004/0099527 A1 | 5/2004 | Nakayama et al. |
| 2006/0141315 A1 | 1/2006 | Murata |
| 2006/0063903 A1 | 3/2006 | Kasahara et al. |
| 2007/0202377 A1 | 8/2007 | Satoru et al. |
| 2008/0292964 A1 | 11/2008 | Kazacos et al. |
| 2011/0318669 A1 | 12/2011 | Miyake et al. |
| 2012/0045680 A1 | 2/2012 | Dong et al. |
| 2012/0135278 A1 | 5/2012 | Tomohisa et al. |
| 2012/0178017 A1 | 7/2012 | Takahiko et al. |
| 2013/0045400 A1 | 2/2013 | Dong et al. |

FOREIGN PATENT DOCUMENTS

| | | |
|---|---|---|
| JP | 62-226580 | 10/1987 |
| JP | 05-242905 | 9/1993 |
| JP | 05-275108 | 10/1993 |
| JP | 06-188005 | 7/1994 |
| JP | 06-260183 | 9/1994 |
| JP | 06-105615 | 12/1994 |
| JP | 09-92321 | 4/1997 |
| JP | 09-223513 | 6/1997 |
| JP | 10-208767 | 8/1998 |
| JP | 11-260390 | 9/1999 |
| JP | 2000-235849 | 8/2000 |
| JP | 2002-352819 | 12/2002 |
| JP | 2004-273255 | 9/2004 |
| JP | 2005-158383 | 6/2005 |
| JP | 2005-294171 | 10/2005 |
| JP | 2006-59560 | 3/2006 |
| JP | 2008-544444 | 12/2008 |
| JP | 2009-057567 | 3/2009 |
| JP | 2009-242688 | 10/2009 |
| JP | 2010-086935 | 4/2010 |
| JP | 2011-54315 | 3/2011 |
| WO | 2002/0026883 | 4/2002 |
| WO | 2005/0103161 | 11/2005 |
| WO | 2006/046620 | 5/2006 |
| WO | 2010-101195 | 9/2010 |
| WO | 2010/143634 | 12/2010 |
| WO | 2011/034179 | 3/2011 |
| WO | 2011/111717 | 9/2011 |

OTHER PUBLICATIONS

International Search Report issued with respect to application No. PCT/JP2012/083944, dated Feb. 12, 2013.
International preliminary report on patentability issued with respect to application No. PCT/JP2012/083944, dated Feb. 12, 2013.
International search report issued with respect to application No. PCT/JP2012/083950, dated Apr. 2, 2013.
International preliminary report on patentability issued with respect to application No. PCT/JP2012/083950, dated Apr. 2, 2013.
International search report issued with respect to application No. PCT/JP2012/083961 dated Feb. 12, 2013.
International preliminary report on patentability issued with respect to application No. PCT/JP2012/083961, dated Feb. 12, 2013.
International search report issued with respect to application No. PCT/JP2012/083953 dated Apr. 9, 2013.
International preliminary report on patentability issued with respect to application No. PCT/JP2012/083953, dated Apr. 9, 2013.
European search report issued with respect to application No. 12863252.8, dated May 8, 2015.
Xiao Chuan et al., "Short-side-chain perfluorosulphonic acid membranes applied in high temperature", Chinese journal of power sources, May 2011, vol. 35, No. 5 (includes English language abstract).

* cited by examiner

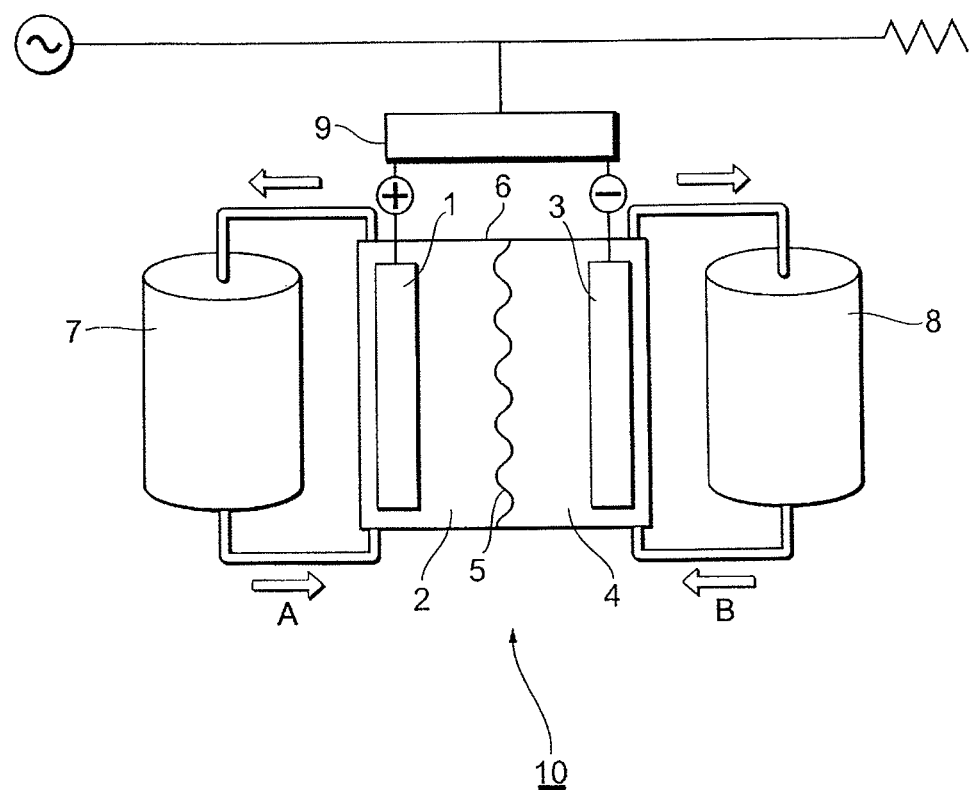

REDOX FLOW SECONDARY BATTERY AND ELECTROLYTE MEMBRANE FOR REDOX FLOW SECONDARY BATTERY

The present application is a divisional of U.S. application Ser. No. 14/368,017, which is a National stage of International Patent Application No. PCT/JP2012/083950 filed Dec. 27, 2012, which claims priority to Japanese Application No. 2011-290033 filed Dec. 28, 2011. The disclosures of U.S. application Ser. No. 14/368,017 and International Patent Application No. PCT/JP2012/083950 are incorporated by reference herein in their entireties.

TECHNICAL FIELD

The present invention relates to a redox flow secondary battery, and an electrolyte membrane for the redox flow secondary battery.

BACKGROUND ART

Redox flow secondary batteries are to store and discharge electricity, and belong to large-size stationary batteries used for leveling the amounts of electricity used. The redox flow secondary battery is configured such that a positive electrode and an electrolyte solution containing a positive electrode active substance (positive electrode cell) and a negative electrode and a negative electrode electrolyte solution containing a negative electrode active substance (negative electrode cell) are separated by a separation membrane; charge and discharge are carried out by utilizing the oxidation and reduction reactions of both the active substances; and the electrolyte solutions including both the active substances are circulated from storage tanks to an electrolytic bath, and a current is taken out and utilized.

As an active substance contained in an electrolyte solution, there are used, for example, iron-chromium-based ones, chromium-bromine-based ones, zinc-bromine-based ones, and vanadium-based ones utilizing the difference in electric charge.

Particularly, vanadium-type secondary batteries, since having advantages of a high electromotive force, a high electrode reaction rate of vanadium ions, only a small amount of hydrogen generated as a side-reaction, a high output, and the like, are being developed earnestly.

For separation membranes, devices are made so that electrolyte solutions containing active substances of both electrodes are not mixed. However, conventional separation membranes are liable to be oxidized and for example a problem thereof is that the electric resistance needs to be made sufficiently low. In order to raise the current efficiency, an ion-exchange membrane is demanded which is excellent in the ion permselectivity preventing the mutual permeation of each active substance ion contained in each cell electrolyte solution (contamination with electrolytes in electrolyte solutions of both electrodes) as much as possible, and allowing sufficiently easy permeation of protons ($H^+$) carrying the charge.

The vanadium-type secondary battery utilizes an oxidation and reduction reaction of divalent vanadium ($V^{2+}$)/ trivalent vanadium ($V^{3+}$) in a negative electrode cell, and oxidation and reduction reaction of tetravalent vanadium ($V^{4+}$)/pentavalent vanadium ($V^{5+}$) in a positive electrode cell. Therefore, since electrolyte solutions of the positive electrode cell and the negative electrode cell have ion species of the same metal, even if the electrolyte solutions are permeated through a separation membrane and mixed, the ion species are normally reproduced by charging; therefore, there hardly arises a large problem as compared with other metal species. However, since active substances becoming useless increase and the current efficiency decreases, it is preferable that the active substance ions freely permeate as little as possible.

There are conventionally batteries utilizing various types of separation membranes (hereinafter, also referred to as "electrolyte membrane" or simply "membrane"); and for example, batteries are reported which use porous membranes allowing free permeation by an ionic differential pressure and an osmotic pressure of electrolyte solutions as the driving force. For example, Patent Literature 1 discloses as such a porous membrane a polytetrafluoroethylene (hereinafter, also referred to as "PTFE") porous membrane, a polyolefin (hereinafter, also referred to as "PO")-based porous membrane, a PO-based nonwoven fabric, and the like.

Patent Literature 2 discloses a composite membrane in combination of a porous membrane and a hydrous polymer so that both electrolyte solutions do not move by a pressure difference between cells.

Patent Literature 3 discloses the utilization of a membrane of a cellulose or an ethylene-vinyl alcohol copolymer as a nonporous hydrophilic polymer membrane having a hydrophilic hydroxyl group.

Patent Literature 4 states that the utilization of a polysulfone-based membrane (anion-exchange membrane) as a hydrocarbon-based ion-exchange resin makes the current efficiency thereof 80% to 88.5% and the radical oxidation resistance excellent.

Patent Literature 5 discloses a method of using a fluorine-based or a polysulfone-based ion-exchange membrane as a separation membrane and making expensive platinum to be carried on a porous carbon of a positive electrode in order to raise the current efficiency, to thereby raise the reaction efficiency.

Patent Literature 6 discloses an iron-chromium-type redox flow battery in which a hydrophilic resin is coated on pores of a porous membrane of a polypropylene (hereinafter, also referred to as "PP") or the like. An Example of the Patent Literature uses a membrane covered in a thickness of several micrometers with a fluorine-based ion-exchange resin (made by Du Pont K.K., registered trademark: "Nafion") on both surfaces of a PP porous membrane of 100 μm in thickness. Here, Nafion is a copolymer containing a repeating unit represented by —($CF_2$—$CF_2$)— and a repeating unit represented by —($CF_2$—CF(—O—($CF_2$CFXO)$_n$—($CF_2$)$_m$—$SO_3H$))— wherein X=$CF_3$, n=1, and m=2.

Patent Literature 7 discloses an example of a vanadium-type battery decreased in the cell electric resistance as much as possible and raised in the efficiency by the improvement of the electrode sides using of a two-layer liquid-permeable porous carbon electrode having a specific surface grating.

Patent Literature 8 discloses an example of a vanadium-type redox flow battery using a separation membrane which is low in the resistance, is excellent in the proton permeability, is of an anion-exchange type having a pyridinium group (utilizing $N^+$ of a cation), and contains a crosslinked polymer obtained by copolymerizing a styrene-based monomer and divinylbenzene.

Patent Literature 9 discloses an example of improving the ion permselectivity by utilizing a membrane having a structure in which a cation-exchange membrane (a fluorine-based polymer or another hydrocarbon-based polymer) and an anion-exchange membrane (a polysulfone-based polymer)

are alternately laminated, and disposing a cation-exchange membrane on the side of a positive electrode electrolyte solution.

Patent Literature 10 discloses an example of using an anion-exchange membrane, as a membrane excellent in the chemical resistance, low in the resistance, and excellent in the ion permselectivity, obtained by compositing a porous base material composed of a porous PTFE-based resin with a crosslinked polymer having a repeating unit of a vinyl heterocyclic compound having two or more hydrophilic groups (vinylpyrrolidone having an amino group, or the like). The principle described therein is that although when a potential difference is applied on metal cations having a large ion diameter and a much amount of electric charge, the membrane permeation of the metal cations is inhibited due to the electric repulsion by cations of the respective separation membrane surfaces, protons (H+), having a small ion diameter and being monovalent can easily diffuse in and permeate the separation membrane having cations to thereby give a low electric resistance.

CITATION LIST

Patent Literature

Patent Literature 1: Japanese Patent Laid-Open No. 2005-158383
Patent Literature 2: Japanese Patent Publication No. H6-105615
Patent Literature 3: Japanese Patent Laid-Open No. S62-226580
Patent Literature 4: Japanese Patent Laid-Open No. H6-188005
Patent Literature 5: Japanese Patent Laid-Open No. H5-242905
Patent Literature 6: Japanese Patent Laid-Open No. H6-260183
Patent Literature 7: Japanese Patent Laid-Open No. H9-92321
Patent Literature 8: Japanese Patent Laid-Open No. H10-208767
Patent Literature 9: Japanese Patent Laid-Open No. H11-260390
Patent Literature 10: Japanese Patent Laid-Open No. 2000-235849

SUMMARY OF INVENTION

Technical Problem

However, only simply making the separation membrane thin as described in Patent Literature 1 is insufficient for the improvement of the ion permselectivity, the reduction of the electric resistance originated from the separation membrane, and the improvement of the current efficiency.

The composite membrane disclosed in Patent Literature 2 has a high electric resistance, and a problem thereof is that each ion freely diffuses though not so easily as in porous membranes. The membrane disclosed in Patent Literature 3 also has the similar problem as in the above, and is inferior also in the oxidation-resistant durability.

The battery disclosed in Patent Literature 4 is yet insufficient in the current efficiency, inferior also in the oxidative deterioration resistance in a sulfuric acid electrolyte solution over a long period. It is stated in a Comparative Example of the Patent Literature that the current efficiency as a Teflon (registered trademark)-based ion-exchange membrane is 64.8 to 78.6%, which has a problem with the performance.

The battery disclosed in Patent Literature 5 also cannot solve the similar problem as in the above, and a problem thereof is that the large-size facility is resultantly high in price.

Patent Literature 6 states that the membrane disclosed therein increases in the internal resistance unless the thickness of a coated membrane is made extremely thin (several micrometers). No devices to improve the ion permselectivity are described at all.

A contrivance of the electrode as described in Patent Literature 7 cannot resolve the improvement of the ion permselectivity, the increase of the electric resistance originated from the separation membrane, and the reduction of the current efficiency.

The battery disclosed in Patent Literature 8 is insufficient in the current efficiency, and has a problem with the long-term usage because of oxidative deterioration.

A problem of the membrane disclosed in Patent Literature 9 is that the electric resistance is high.

The result shown in an Example of Patent Literature 10 cannot be said to exhibit a sufficiently low internal resistance (electric resistance) of the membrane, and has the problem of the oxidative deterioration resistance in the long-term usage.

Electrolyte membranes (separation membranes) for conventional vanadium-type redox flow batteries are used for the purpose of suppressing the diffusion, migration, and permeation of active substances to counter electrodes (cells), and allowing protons ($H^+$) to selectively permeate along with the operation of charge and discharge as the purpose, in each of a cell (negative electrode side) in which ions of a low-valent group of vanadium ions, which are active substances of electrolyte solutions of both electrodes, hold a large majority, and a cell (positive electrode side) in which ions of a high-valent group of the vanadium ions hold a large majority. However, the performance cannot be said to be sufficient at present.

As a membrane base material containing a hydrocarbon-based resin as a main component, there are used a mere porous membrane having no ion permselectivity only simply separating electrolyte solutions containing electrolytes as principal roles of both cells, a (nonporous) hydrophilic membrane base material having no ion permselectivity, a porous membrane embedded with or covered with a hydrophilic membrane base material, and the like. There are also used as a separation membrane a so-called cation-exchange membrane in which the membrane itself has various types of anion groups, or a composite membrane in which a cation-exchange resin is covered on or embedded in pores of a porous membrane base material, an anion-exchange membrane in which the membrane itself similarly has cation groups, or a composite membrane in which an anion-exchange resin is similarly covered on or embedded in a porous membrane base material, a membrane of a laminate type of both, and the like; and studies making the most of respective features are being carried out.

No ion-exchange resin separation membrane as the separation membrane has been developed so far which sufficiently satisfies two contrary performances of the electric resistance (depending mainly on the proton permeability) and the permeability inhibition of metal ions (polyvalent cations), which are active substances as the principal parts, and further no ion-exchange resin separation membrane has been developed so far. Also for fluorine-based ion-exchange resins, no sufficient studies of devices have been made on mutually contradictory properties of the excellent proton (H+) permeability and the inhibition of the active substance ion permeation; and no electrolyte membrane for redox flow battery has been developed which sufficiently satisfies a low electric resistance, the oxidative deterioration resistance (hydroxy radical resistance) over a long period, and the like.

In consideration of the above-mentioned situation, it is an object of the present invention to provide: an electrolyte membrane for a redox flow secondary battery, the electrolyte membrane having the excellent ion permselectivity capable of suppressing the ion permselectivity of active substances without impairing the proton (H+) permeability, being low in the electric resistance, and being excellent in the current efficiency as well; and a redox flow secondary battery using the electrolyte membrane.

Solution to Problem

As a result of exhaustive studies to solve the above-mentioned problems, the present inventors have found that by incorporating a perfluorocarbonsulfonic acid resin (hereinafter, also referred to as "PFSA resin") having a specific structure and an specific equivalent weight EW, and further regulating the ionic conductivity of the membrane in a specific range, an electrolyte membrane for a redox flow secondary battery, the electrolyte membrane having the excellent ion permselectivity, being low in the electric resistance, and being excellent in the current efficiency as well, and a redox flow secondary battery using the electrolyte membrane can be achieved. These findings have led to the completion of the present invention.

That is, the present invention is as follows.

[1]

A redox flow secondary battery comprising an electrolytic bath comprising:

a positive electrode cell chamber comprising a positive electrode composed of a carbon electrode;

a negative electrode cell chamber comprising a negative electrode composed of a carbon electrode; and an electrolyte membrane as a separation membrane to separate the positive electrode cell chamber and the negative electrode cell chamber, wherein the positive electrode cell chamber comprises a positive electrode electrolyte solution comprising a positive electrode active substance; and the negative electrode cell chamber comprises a negative electrode electrolyte solution comprising a negative electrode active substance;

wherein the redox flow secondary battery charges and discharges based on changes in valences of the positive electrode active substance and the negative electrode active substance in the electrolyte solutions;

wherein the electrolyte membrane comprises an ion-exchange resin composition comprising a perfluorocarbonsulfonic acid resin having a structure represented by the following formula (1):

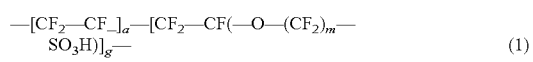

wherein a and g represent numbers satisfying 0≤a<1, 0<g≤1, and a+g=1; and m represents an integer of 1 to 6;

wherein the perfluorocarbonsulfonic acid resin has an equivalent weight EW (a dry mass in grams per equivalent of ion-exchange groups) of 250 to 1,500 g/eq; and wherein the electrolyte membrane has an ionic conductivity at 110° C. at a relative humidity of 50% RH of 0.05 S/cm or higher.

[2]

The redox flow secondary battery according to the above [1], wherein the perfluorocarbonsulfonic acid resin has an equivalent weight EW (a dry mass in grams per equivalent of ion-exchange groups) of 250 to 700 g/eq.

[3]

The redox flow secondary battery according to the above [1] or [2], wherein the positive electrode electrolyte solution and the negative electrode electrolyte solution are sulfuric acid electrolyte solutions comprising vanadium.

[4]

The redox flow secondary battery according to any one of the above [1] to [3], wherein the electrolyte membrane has an equilibrium moisture content of 5 to 80% by mass.

[5]

The redox flow secondary battery according to any one of the above [1] to [4], wherein the ion-exchange resin composition comprises 0.1 to 20 parts by mass of a polyphenylene ether resin and/or a polyphenylene sulfide resin with respect to 100 parts by mass of the perfluorocarbonsulfonic acid resin.

[6]

An electrolyte membrane for a redox flow secondary battery, comprising an ion-exchange resin composition comprising a perfluorocarbonsulfonic acid resin having a structure represented by the following formula (1):

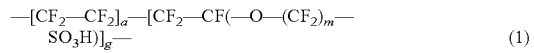

wherein a and g represent numbers satisfying 0≤a<1, 0<g≤1, and a+g=1; and m represents an integer of 1 to 6;

wherein the perfluorocarbonsulfonic acid resin has an equivalent weight EW (a dry mass in grams per equivalent of ion-exchange groups) of 250 to 1,500 g/eq; and wherein the electrolyte membrane has an ionic conductivity at 110° C. at a relative humidity of 50% RH of 0.05 S/cm or higher.

[7]

The electrolyte membrane for a redox flow secondary battery according to the above [6], wherein the perfluorocarbonsulfonic acid resin has an equivalent weight EW (a dry mass in grams per equivalent of ion-exchange groups) of 250 to 700 g/eq.

[8]

The electrolyte membrane for a redox flow secondary battery according to the above [6] or [7], wherein the electrolyte membrane has an equilibrium moisture content of 5 to 80% by mass.

[9]

The electrolyte membrane for a redox flow secondary battery according to any one of the above [6] to [8], wherein the ion-exchange resin composition comprises 0.1 to 20 parts by mass of a polyphenylene ether resin and/or a polyphenylene sulfide resin with respect to 100 parts by mass of the perfluorocarbonsulfonic acid resin.

[10]

The electrolyte membrane for a redox flow secondary battery according to any one of the above [6] to [9], wherein the ion-exchange resin composition has been subjected to a heat treatment at 130 to 200° C. for 1 to 60 min.

Advantageous Effects of Invention

The electrolyte membrane for a redox flow secondary battery according to the present invention has the excellent ion permselectivity. Therefore, the electrolyte membrane has the high proton (hydrogen ions) permeability, is low in the electric resistance, and is capable of suppressing the permeation of active substance ions in electrolyte solutions, and further achieves a high current efficiency.

BRIEF DESCRIPTION OF DRAWING

FIG. 1 shows an example of a schematic diagram of a redox flow secondary battery in the present embodiments.

DESCRIPTION OF EMBODIMENTS

Hereinafter, embodiments to carry out the present invention (hereinafter, referred to as "present embodiments") will be described in detail. The present invention is not limited to the following present embodiments.

[Redox Flow Secondary Battery]

A redox flow secondary battery in the present embodiment, comprising an electrolytic bath comprising:

a positive electrode cell chamber comprising a positive electrode composed of a carbon electrode;

a negative electrode cell chamber comprising a negative electrode composed of a carbon electrode; and an electrolyte membrane as a separation membrane to separate the positive electrode cell chamber and the negative electrode cell chamber, wherein the positive electrode cell chamber comprises a positive electrode electrolyte solution comprising a positive electrode active substance; and the negative electrode cell chamber comprises a negative electrode electrolyte solution comprising a negative electrode active substance;

wherein the redox flow secondary battery charges and discharges based on changes in valences of the positive electrode active substance and the negative electrode active substance in the electrolyte solutions;

wherein the electrolyte membrane comprises an ion-exchange resin composition comprising a PFSA resin having a structure represented by the following formula (1):

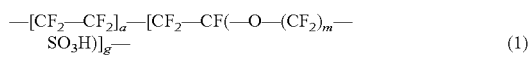

$$-[CF_2-CF_2]_a-[CF_2-CF(-O-(CF_2)_m-SO_3H)]_g- \quad (1)$$

wherein a and g represent numbers satisfying $0 \leq a < 1$, $0 < g \leq 1$, and $a+g=1$, and m represents an integer of 1 to 6;

wherein the PFSA resin has an equivalent weight EW (a dry mass in grams per equivalent of ion-exchange groups) of 250 to 1,500 g/eq; and wherein the electrolyte membrane has an ionic conductivity at 110° C. at a relative humidity of 50% RH of 0.05 S/cm or higher.

FIG. 1 shows an example of a schematic diagram of a redox flow secondary battery in the present embodiment. A redox flow secondary battery 10 in the present embodiment has an electrolytic bath 6 which comprises a positive electrode cell chamber 2 comprising a positive electrode 1 composed of a carbon electrode, a negative electrode cell chamber 4 comprising a negative electrode 3 composed of a carbon electrode, and an electrolyte membrane 5 as a separation membrane to separate the positive electrode cell chamber 2 and the negative electrode cell chamber 4, wherein the positive electrode cell chamber 2 comprises a positive electrode electrolyte solution comprising an active substance; and the negative electrode cell chamber 4 comprises a negative electrode electrolyte solution comprising an active substance. The positive electrode electrolyte solution and the negative electrode electrolyte solution comprising the active substances are, for example, stored in a positive electrode electrolyte solution tank 7 and a negative electrode electrolyte solution tank 8, and fed to respective cell chambers by pumps or the like (arrows A and B). The current generated by the redox flow secondary battery may be converted from direct current to alternating current through an AC/DC converter 9.

The redox flow secondary battery in the present embodiment has a structure in which each of liquid-permeable porous current collector electrodes (for the negative electrode and for the positive electrode) is disposed on either side of the separation membrane, and these are held by pressing; one side partitioned by the separation membrane is made the positive electrode cell chamber and the other side is made the negative electrode cell chamber; and the thicknesses of both the cell chambers are secured by spacers.

In the case of a vanadium-type redox flow secondary battery, the charge and discharge of the battery is carried out by circulating the positive electrode electrolyte solution composed of a sulfuric acid electrolyte solution comprising tetravalent vanadium ($V^{4+}$) and pentavalent vanadium ($V^{5+}$) to the positive electrode cell chamber, and circulating the negative electrode electrolyte solution comprising trivalent vanadium ($V^{3+}$) and divalent vanadium ($V^{2+}$) to the negative electrode cell chamber. In the charge time therein, in the positive electrode cell chamber, vanadium ions release electrons to thereby oxidize $V^{4+}$ to $V^{5+}$; and in the negative electrode cell chamber, electrons having returned through an external circuit reduce $V^{3+}$ to e. In the oxidation and reduction reactions, in the positive electrode cell chamber, protons ($H^+$) become excessive; by contrast, in the negative electrode cell chamber, protons ($H^+$) become insufficient. The excessive protons in the positive electrode cell chamber selectively migrate to the negative electrode chamber through the separation membrane to thereby hold the electric neutrality. In the discharge time, a reaction reverse thereto progresses. The battery efficiency (%) at this time is represented by a ratio (%) obtained by dividing a discharge electric energy by a charge electric energy; and both the electric energies depend on the internal resistance of the battery cells, the ion permselectivity of the separation membrane, and the current losses of others. Since the reduction of the internal resistance improves the voltage efficiency, and the improvement of the ion permselectivity and the reduction of the current losses of others improve the current efficiency, these factors become important indices in the redox flow secondary battery.

[Electrolyte Membrane for a Redox Flow Secondary Battery]

An electrolyte membrane for a redox flow secondary battery in the present embodiment comprises an ion-exchange resin composition comprising a PFSA resin having a specific structure and a specific equivalent weight EW, and has a specific ionic conductivity.

[Ion-Exchange Resin Composition]

(PFSA Resin)

An ion-exchange resin composition in the present embodiment comprises a perfluorocarbonsulfonic acid resin (PFSA resin) having a structure represented by the following formula (1). The PFSA resin used in the present embodiment is not especially limited as long as having a structure represented by the following formula (1), and may have other repeating units.

$$[CF_2CF_2]_a-[CF_2-CF(-O-(CF_2)_m-SO_3H)]_g- \quad (1)$$

wherein a and g represent numbers satisfying $0 \leq a < 1$, $0 < g \leq 1$, and $a+g=1$, and m represents an integer of 1 to 6.

A PFSA resin in the present embodiment is likely to exhibit a high current efficiency as compared with the case where in a usual fluorine-based polyelectrolyte polymer, for example, a copolymer containing a repeating unit represented by —(CF$_2$—CF$_2$)— and a repeating unit represented by —(CF$_2$—CF(—O—(CF$_2$CFXO)$_m$—SO$_3$H))— wherein X represents F or CF$_3$; n represents an integer of 1 to 5; and m represents an integer of 0 to 12, with the proviso that n and m are not 0 at the same time, the n in the repeating unit is 1 or more. Although the reason is not clear, it is conceivable that in the PFSA resin in the present embodiment, since the number of —(CF$_2$CFXO)$_n$— groups, whose electron-attractivity is strong, is small, and the electron-attractivity on SO$_3^-$ groups thereby becomes weak and the bonding of the SO$_3^-$ groups with vanadium ions in electrolyte solutions becomes weak, the concentration of vanadium ions contributing to the charge and discharge is not decreased.

A PFSA resin in the present embodiment can be obtained, for example, by producing a precursor of a polyelectrolyte polymer (hereinafter, also referred to as "PFSA resin precursor"), and thereafter subjecting the precursor to a hydrolysis treatment.

A PFSA resin can be obtained, for example, by hydrolyzing a PFSA resin precursor composed of a copolymer of a fluorinated vinyl ether compound represented by the following formula (2), (3) or (4) with a fluorinated olefin monomer represented by the following formula (5). A fluorinated vinyl ether compound represented by the following formula (2) is not especially limited as long as containing the compound wherein n=0, and may contain the compound wherein n is 1 to 5. A fluorinated vinyl ether compound represented by the following formula (2), (3), or (4) may be used singly or in combinations of two or more.

$$CF_2=CF—O—(CF_2CFXO)_n\text{-}[A] \quad (2)$$

wherein X represents F or a perfluoroalkyl group having 1 to 3 carbon atoms; n represents an integer of 0 to 5; and A represents (CF$_2$)$_m$-W, m represents an integer of 0 to 6, n and m are not 0 at the same time.

$$CF_2=CF—O—(CF_2)_P—CFX(—O—(CF_2)_K\text{-}W) \quad (3)$$

$$CF_2=CF—O—(CF_2)_P—CFX(—(CF_2)_L—O—(CF_2)_m\text{-}W) \quad (4)$$

wherein X represents a perfluoroalkyl group having 1 to 3 carbon atoms; P represents an integer of 0 to 12; m represents an integer of 0 to 6; K represents an integer of 1 to 5; L represents an integer of 1 to 5; and W represents a functional group capable of being converted to SO$_3$H by hydrolysis.

$$CF_2=CFZ \quad (5)$$

wherein Z represents H, Cl, F, a perfluoroalkyl group having 1 to 3 carbon atoms, or a cyclic perfluoroalkyl group which may contain oxygen.

W denoting a functional group capable of being converted to SO$_3$H by hydrolysis in the above formulae (2), (3) and (4) is not especially limited, but is preferably SO$_2$F, SO$_2$Cl, or SO$_2$Br. Further in the above formulae, X=CF$_3$, W=SO$_2$F, and Z=F are more preferable. Particularly, n=0, m=an integer of 0 to 6, here, n and m are not 0 at the same time, X=CF$_3$, W=SO$_2$F, and Z=F are further preferable because of giving tendencies of providing high hydrophilicity and a solution having a high resin concentration.

The PFSA resin precursor in the present embodiment can be synthesized by well-known means. For example, there are known a method (solution polymerization) in which a fluorinated vinyl compound having the ion-exchange group precursor (W) and a gas of a fluorinated olefin such as tetrafluoroethylene (TFE) are filled, dissolved, and reacted by using a polymerization method or the like utilizing a peroxide of a radical generator and using a polymerization solvent such as a fluorine-containing hydrocarbon, a method (bulk polymerization) of carrying out the polymerization by using the fluorinated vinyl compound itself as a polymerization solvent without using any solvent such as a fluorine-containing hydrocarbon, a method (emulsion polymerization) of filling and reacting the fluorinated vinyl compound and a gas of the fluorinated olefin by using an aqueous solution of a surfactant as a medium, to thereby carry out the polymerization, a method (emulsion polymerization) of filling and emulsifying and reacting the fluorinated vinyl compound and a gas of the fluorinated olefin in an aqueous solution of a surfactant and an emulsifying aid such as an alcohol to thereby carry out the polymerization, and a method (suspension polymerization) of filling and suspending and reacting the fluorinated vinyl compound and a gas of the fluorinated olefin in an aqueous solution of a suspension stabilizer to thereby carry out the polymerization.

In the present embodiment, any PFSA resin precursor fabricated by any polymerization method described above can be used. Any block-shape or taper-shape polymer obtained by regulating the polymerization condition such as the amount of TFE gas supplied may be used as the PFSA resin precursor.

The PFSA resin precursor may be one prepared by treating impure terminals and structurally easily-oxidizable moieties (CO group-, H-bonded moieties and the like) produced in a resin molecular structure during the polymerization reaction by a well-known method under fluorine gas to thereby fluorinate the moieties.

The molecular weight of the PFSA resin precursor is, in terms of a value of a melt flow index (MFI) of the precursor measured according to ASTM: D1238 (measurement conditions: a temperature of 270° C. and a load of 2,160 g), preferably 0.05 to 50 (g/10 min). The range of the MFI of the precursor resin is more preferably 0.1 to 30 (g/10 min), and still more preferably 0.5 to 20 (g/10 min).

Examples thereof include a method in which the PFSA resin precursor is extruded through a nozzle, a die, or the like by using an extruder, and thereafter is subjected to a hydrolysis treatment, and a method in which the resin precursor product as it is on the polymerization, that is, a disperse-liquid product, or a product made powdery by precipitation and filtration is thereafter subjected to a hydrolysis treatment. The shape of the PFSA resin precursor is not especially limited, but from the viewpoint of accelerating treatment rates in a hydrolysis treatment and an acid treatment described later, is preferably a pellet-shape of 0.5 cm$^3$ or smaller, a disperse liquid or a powdery particle-shape; and among these, powdery bodies after the polymerization are preferably used. From the viewpoint of the costs, an extruded film-shape resin precursor may be used.

A resin precursor obtained as in the above, and as required, molded is then immersed in a basic reaction liquid to be thereby subjected to a hydrolysis treatment. The basic reaction liquid used in the hydrolysis treatment is not especially limited, but preferable are an aqueous solution of an amine compound such as dimethylamine, diethyleamine, monomethylamine, or monoethylamine, and an aqueous solution of a hydroxide of an alkali metal or an alkaline earth metal; and more preferable are aqueous solutions of sodium hydroxide and potassium hydroxide. In the case of using a hydroxide of an alkali metal or an alkaline earth metal, the content thereof is not especially limited, but preferably 10 to 30% by mass with respect to the whole of a reaction liquid. The reaction liquid more preferably further contains a swelling organic compound such as methyl alcohol, ethyl alcohol, acetone, and dimethyl sulfoxide (DMSO). The content of a swelling organic compound is preferably 1 to 30% by mass with respect to the whole of the reaction liquid.

The PFSA resin precursor is subjected to a hydrolysis treatment in the basic reaction liquid, thereafter sufficiently washed with warm water or the like, and thereafter subjected to an acid treatment. An acid used in the acid treatment is not especially limited, but is preferably a mineral acid such as hydrochloric acid, sulfuric acid, or nitric acid, or an organic acid such as oxalic acid, acetic acid, formic acid, or trifluoroacetic acid, and more preferably a mixture of these acids and water. The above acids may be used singly or in combinations of two or more. A basic reaction liquid used in the hydrolysis treatment may be removed by a treatment with a cation-exchange resin or the like previously before the acid treatment.

A PFSA resin precursor is protonated by an acid treatment to thereby produce an ion-exchange group. For example, a PFSA resin precursor of W is protonated by an acid treatment to thereby make $SO_3H$. A PFSA resin obtained by the hydrolysis treatment and acid treatment is enabled to be dispersed or dissolved in a protonic organic solvent, water, or a mixed solvent of the both.

(Equivalent Weight EW)

The equivalent weight EW (a dry mass of a PFSA resin in grams per equivalent of ion-exchange groups) of the PFSA resin in the present embodiment is 250 to 1,500 (g/eq). The upper limit of the EW is preferably 700 (g/eq), more preferably 600 (g/eq), and still more preferably 550 (g/eq). The lower limit of the EW is preferably 300 (g/eq), more preferably 350 (g/eq), and still more preferably 400 (g/eq). Since there are some cases where a smaller EW gives, though giving a higher ionic conductivity, a higher solubility to hot water, the EW is preferably regulated in the above suitable range.

The regulation of the equivalent weight EW of a PFSA resin in the above range can impart excellent hydrophilicity to an ion-exchange resin composition comprising the PFSA resin; and an electrolyte membrane obtained by using the resin composition results in having a low electric resistance and the high hydrophilicity, and having a large number of smaller clusters (minute moieties where ion-exchange groups coordinate and/or adsorb water molecules), and tends to exhibit the high oxidation resistance (hydroxy radical resistance), a low electric resistance, and the good ion permselectivity.

The equivalent weight EW of a PFSA resin is preferably 250 (g/eq) or higher from the viewpoint of the hydrophilicity and the water resistance of the membrane, and preferably 700 (g/eq) or lower from the viewpoint of the hydrophilicity and the electric resistance of the membrane. In the case where the EW of a PFSA resin is near the lower limit value, the resin may be modified to thereby control the solubility and the excessive swell by subjecting a part of ion-exchange groups of side chains of the resin to an intermolecular direct or indirect partial crosslinking reaction.

Examples of the above partial crosslinking reaction include a reaction of an ion-exchange group with a functional group or the main chain of another molecule, a reaction of ion-exchange groups, and a crosslinking reaction (covalent bond) through an oxidation-resistant low molecular compound, oligomer, polymeric substance, or the like, and as the case may be, a reaction with a substance to form a salt (including an ionic bond with a $SO_3H$ group). Examples of the oxidation-resistant low molecular compound, oligomer, and polymeric substance include polyhydric alcohols and organic diamines.

In the case of carrying out the partial crosslinking reaction, there is the case where even a low EW of a PFSA resin is allowed. That is, it suffices if the water solubility is decreased (the water resistance is improved) without so much sacrificing ion-exchange groups (in other words, EW). This also applies to the case where a PFSA resin is in a low melt flow region (polymer region) and has much intermolecular entanglement.

A part of functional groups (for example, $SO_2F$ group) of a PFSA resin before hydrolysis may be partially (including intermolecularly) imidized (e.g., alkylimidized).

The equivalent weight EW of a PFSA resin can be measured by replacing the PFSA resin by a salt, and back-titrating the solution with an alkali solution.

The equivalent weight EW of the PFSA resin can be regulated by selecting copolymerization ratios of fluorine-based monomers, kinds of the monomers, and the like.

Nafion (registered trademark of Du Pont K.K.), which is a fluorine-based resin stated in the above-mentioned Patent Literature, is known to be a compound in which in a copolymer containing a repeating unit represented by $-(CF_2-CF_2)-$ and a repeating unit represented by $-(CF_2-CF(-O-(CF_2CFXO)_n-(CF_2)_m-SO_3H))-$, $X=CF_3$, $n=1$, and $m=2$, and the EW is 893 to 1,030. However, in the case where Nafion is used as a material of an electrolyte membrane for a redox flow secondary battery, it is likely that the hydrophilicity is insufficient; the electric resistance is high; and the ion permselectivity and the current efficiency also are worsened.

(Ionic Conductivity)

The ionic conductivity at 110° C. at a relative humidity of 50% RH of an electrolyte membrane in the present embodiment is 0.05 S/cm or higher, and preferably 0.10 S/cm or higher. In an electrolyte membrane in the present embodiment, the ionic conductivity preferably at 40% RH is 0.05 S/cm or higher; the ionic conductivity more preferably at 30% RH is 0.05 S/cm or higher; and the ionic conductivity still more preferably at 20% RH is 0.05 S/cm or higher. Further in an electrolyte membrane in the present embodiment, the ionic conductivity preferably at 40% RH is 0.10 S/cm or higher; the ionic conductivity more preferably at 30% RH is 0.10 S/cm or higher; and the ionic conductivity still more preferably at 20% RH is 0.10 S/cm or higher. A higher ionic conductivity of an electrolyte membrane is better, but even if the ionic conductivity, for example, at 110° C. at a relative humidity of 50% RH is 1.0 S/cm or lower, the electrolyte membrane usually exhibits the sufficient performance. If the ionic conductivity of an electrolyte membrane is in the above range, the electrolyte membrane becomes low in the electric resistance and exhibits an excellent current efficiency.

The content of a PFSA resin contained in an ion-exchange resin composition forming an electrolyte membrane in the present embodiment is preferably about 33.3 to 100% by mass, more preferably 40 to 100% by mass, and still more preferably 50 to 99.5% by mass.

If an ion-exchange resin composition in the present embodiment contains, in addition to the above-mentioned PFSA resin, a basic polymer (including a low molecular weight substance such as an oligomer), the chemical stability (mainly the oxidation resistance and the like) as the resin composition is likely to increase. These compounds partially make ion complexes in a microparticulate form or a form near molecular dispersion in the resin composition, and form an ionically crosslinked structure. Particularly in the case where EW of a PFSA resin is low, in the case of (300 to 500), these compounds are preferable from the viewpoint of the balance among the water resistance, the electric resistance, and the like.

The PFSA resin may be contained singly in a form of a partial salt (about 0.01 to 5 equivalent % of the equivalent of the whole ion-exchange group) with an alkali metal, an alkaline earth metal, or besides, a radical-decomposable transition metal (Ce-based additive, Mn-based additive, or the like), or in a form in concurrent use therewith of a basic polymer.

(Polyphenylene Ether Resin and/or Polyphenylene Sulfide Resin)

An ion-exchange resin composition contains, with respect to 100 parts by mass of a PFSA resin used in the present embodiment, preferably 0.1 to 20 parts by mass of a polyphenylene ether resin (hereinafter, also referred to as "PPE resin") and/or a polyphenylene sulfide resin (hereinafter, also referred to as "PPS resin"), more preferably 0.5 to 10 parts by mass thereof, and still more preferably 1 to 5 parts by mass thereof. Making PPE and/or PPS in the above range is likely to make the membrane strength better.

A method of adding a PPE resin and/or a PPS resin may involve mixing by an extrusion method, or mixing an aqueous solvent dispersion of a PPE resin and/or a PPS resin to a stock dispersion of a resin composition containing a PFSA resin as a main component.

The PPS resin in the present embodiment is preferably a PPS resin containing 70 mol % or more of a paraphenylene sulfide skeleton, and more preferably 90 mol % or more thereof. A method for producing a PPS resin is not especially limited, and includes a method in which usually a halogen-substituted aromatic compound, for example, p-dichlorobenzene is polymerized in the presence of sulfur and sodium carbonate, a method of the polymerization in the presence of sodium sulfide or sodium hydrosulfide and sodium hydroxide or hydrogen sulfide and sodium hydroxide or sodium aminoalkanoate in a polar solvent, and a method of self-condensation of p-chlorothiophenol. Among these, a method is suitable in which sodium sulfide and p-dichlorobenzene are reacted in an amide-based solvent such as N-methylpyrrolidone or dimethylacetamide, or a sulfone-based solvent such as sulfolane. Specifically, there can be used methods described, for example, in U.S. Pat. No. 2,513,188, Japanese Patent Publication Nos. 44-27671, 45-3368, and 52-12240, Japanese Patent Laid-Open No. 61-225217, and U.S. Pat. No. 3,274,165, British Patent No. 1160660, further, Japanese Patent Publication No. 46-27255, Belgian Patent No. 29437, and Japanese Patent Laid-Open No. 5-222196, and there can be used methods of prior arts exemplified in these patents.

The melt viscosity (a value acquired by holding at 300° C. and a load of 196 N for 6 min using a flow tester whose L/D (L: orifice length, D: orifice diameter)=10/1) at 320° C. of a PPS resin is preferably 1 to 10,000 poises, and more preferably 100 to 10,000 poises.

A PPS resin into which an acidic functional group has been incorporated can further be used suitably. An acidic functional group to be incorporated in not especially limited, for example, preferable are a sulfonic acid group, a phosphoric acid group, a carboxylic acid group, a maleic acid group, a maleic anhydride group, a fumaric acid group, an itaconic acid group, an acrylic acid group, and a methacrylic acid group; and more preferable is a sulfonic acid group.

A method of incorporating an acidic functional group is not especially limited, and usual methods can be used. The incorporation of a sulfonic group can be carried out, for example, by using a sulfonating agent such as sulfuric anhydride or fuming sulfuric acid under the well-known condition; for example, the incorporation can be carried out under the conditions described in K. Hu, T. Xu, W. Yang, Y. Fu, Journal of Applied Polymer Science, Vol. 91, and E. Montoneri, Journal of Polymer Science: Part A: Polymer Chemistry, Vol. 27, 3043-3051(1989).

Also a PPS resin can suitably be used which is prepared by substituting the acidic functional group incorporated in a PPS resin with a metal salt or an amine salt. As the metal salt, preferably used are alkali metal salts such as sodium salts and potassium salts, and alkaline earth metal salts such as calcium salts.

The PPE resin is not especially limited, and examples thereof include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether), and also include polyphenylene ether copolymers such as copolymers of 2,6-dimethylphenol with other phenols (for example, 2,3,6-trimethylphenol and 2-methyl-6-butylphenol). Among these, poly(2,6-dimethyl-1,4-phenylene ether) and a copolymer of 2,6-dimethylphenol with 2,3,6-trimethylphenol are preferable, and poly(2,6-dimethyl-1,4-phenylene ether) is more preferable.

A method for producing a PPE is not especially limited; and a PPE resin can easily be produced, for example, by oxidatively polymerizing 2,6-xylenol with the use of a complex of a cuprous copper salt with an amine as a catalyst, as described in U.S. Pat. No. 3,306,874. PPE resins can easily be produced also by methods described in U.S. Pat. Nos. 3,306,875, 3,257,357, and 3,257,358, Japanese Patent Publication No. 52-17880, Japanese Patent Laid-Open Nos. 50-51197 and 63-152628, and the like.

In addition to a single PPE described above, also a PPE resin can suitably be used which is prepared by blending a polystyrene (including an atactic high-impact polystyrene) having atactic or syndiotactic stereoregularity in the range of 1 to 400 parts by mass with respect to 100 parts by mass of the PPE component described above.

Also PPE resins can suitably be used which are prepared by incorporating reactive functional groups to various types of polyphenylene ether described above. The reactive functional groups include an epoxy group, an oxazonyl group, an amino group, an isocyanate group, a carbodiimide group, and other acidic functional groups. Among these, acidic functional groups are more suitably used. As acidic functional group to be incorporated, preferable are a sulfonic acid group, a phosphoric acid group, a carboxylic acid group, a maleic acid group, a maleic anhydride group, a fumaric acid group, an itaconic acid group, an acrylic acid group, and a methacrylic acid group; and more preferable is a sulfonic acid group.

The weight-average molecular weight of a PPE resin is preferably 1,000 or higher and 5,000,000 or lower, and more preferably 1,500 or higher and 1,000,000 or lower.

(Fluorine-Based Resins Other than a PFSA Resin Used in the Present Embodiment)

An ion-exchange resin composition in the present embodiment can use not only a PFSA resin used in the present embodiment, but also fluorine-based resins (resins containing carboxylic acid, phosphoric acid, or the like, and other well-known fluorine-based resins) other than the PFSA resin used in the present embodiment. In the case of using two or more of these resins, a mixing method may involve dissolving in a solvent or dispersing in a medium and mixing the resins, or may involve extrusion-mixing resin precursors. The fluorine-based resin is contained, with respect to 100 parts by mass of a PFSA resin used in the present embodiment, preferably in 0 to 50 parts by mass, more preferably in 0 to 30 parts by mass, and still more preferably 0 to 10 parts by mass.

(Equilibrium Moisture Content)

The equilibrium moisture content of an electrolyte membrane is preferably 5% by mass or higher, more preferably 10% by mass or higher, and still more preferably 15% by mass or higher. The upper limit is preferably 80% by mass or lower, more preferably 50% by mass or lower, and still more preferably 40% by mass or lower. If the equilibrium moisture content of an electrolyte membrane is 5% by mass or higher, the electric resistance, the current efficiency, the oxidation resistance, and the ion permselectivity of the membrane are likely to be good. By contrast, if the equilibrium moisture content is 80% by mass or lower, the dimensional stability and the strength of the membrane are likely to be good and the increase of water-soluble components is likely to be suppressed. The equilibrium moisture content of an electrolyte membrane is expressed as an equilibrium (being left for 24 hours) saturated water absorption rate (Wc) at 23° C. and 50% relative humidity (RH), based on the membrane prepared by forming a membrane from a dispersion liquid of the resin composition with water and an alcoholic solvent, and drying the membrane at 160° C. or lower.

The equilibrium moisture content of an electrolyte membrane can be regulated by the similar method as in EW described above.

(Reinforcing Material)

An electrolyte membrane in the present embodiment may have a reinforcing material from the viewpoint of the membrane strength. The reinforcing material is not especially limited, and includes usual nonwoven fabrics and woven cloths, and porous membranes composed of various types of materials.

The porous membrane is not especially limited; but preferable are porous membranes having the good affinity for the fluorine-based polyelectrolyte polymer. Among these, preferable are reinforced electrolyte membranes in which a stretched porous PTFE-based membrane is substantially voidlessly embedded with an ion-exchange resin composition containing a fluorine-based polyelectrolyte polymer in the present embodiment. Such an electrolyte membrane is likely to be excellent in the strength of a thin membrane and be capable of suppressing the dimensional change in the plane (vertical and horizontal) direction.

The reinforced electrolyte membrane can be produced by impregnating a porous membrane with a reasonable amount of a dispersion liquid, with an organic solvent or an alcohol and water as a solvent, of the ion-exchange resin composition in a reasonable concentration, and drying the impregnated porous membrane.

A solvent used in fabrication of the reinforced electrolyte membrane is not especially limited, but is preferably a solvent having a boiling point of 250° C. or lower, more preferably a solvent having a boiling point of 200° C. or lower, and still more preferably a solvent having a boiling point of 120° C. or lower. Among these, water and aliphatic alcohols are preferable, and the solvent specifically includes water, methanol, ethanol, 1-propanol, 2-propanol, 1-butanol, 2-butanol, isobutyl alcohol, and tert-butyl alcohol. The solvents may be used singly or in combinations of two or more.

[Method for Producing an Electrolyte Membrane]

A production method of an electrolyte membrane (membrane formation method) in the present embodiment is not especially limited, and a well-known extrusion method or cast membrane formation method can be used. The electrolyte membrane may be of a single layer or of a multilayer (2 to 5 layers); and in the case of a multilayer, the performance of the electrolyte membrane can be improved by laminating membranes having different properties (for example, resins having different EWs and functional groups). In the case of a multilayer, the lamination may be carried out at the extrusion membrane production time or the cast time, or each membrane obtained may be laminated.

The electrolyte membrane formed in the above method is sufficiently washed with water (or, as required, before water washing, treated with an aqueous acidic liquid such as dilute hydrochloric acid, nitric acid, or sulfuric acid) to thereby remove impurities, and is preferably subjected to a heat treatment in the air (preferably in an inert gas) preferably at 130 to 200° C., more preferably at 140 to 180° C., and still more preferably 150 to 170° C., for 1 to 60 min. The time of the heat treatment is more preferably 1 to 30 min, still more preferably 2 to 20 min, further still more preferably 3 to 15 min, and still more further preferably about 5 to 10 min.

One of reasons to carry out the heat treatment is because since in the state as it is at the membrane formation time, sufficient entanglements of the resin among particles (among primary particles and secondary particles) and molecules originated from raw materials are not made, the heat treatment is useful for the purpose of making interparticulate and intermolecular entanglements of the resin, particularly in order to stabilize the water resistance (particularly decreasing the hot water-dissolving component ratio) and the saturated water absorption rate of water, and produce stable clusters. The heat treatment is useful also from the viewpoint of the improvement of the membrane strength. Particularly in the case of using the cast membrane formation method, the heat treatment is useful.

Another reason for carrying out the above heat treatment is because the formation of fine intermolecular crosslinking among molecules of a PFSA resin presumably contributes to the formation of clusters excellent in the water resistance and stable, and provides an effect of making the cluster diameter uniform and small.

A further reason is because the above heat treatment presumably causes at least a part of ion-exchange groups of a PFSA resin in an ion-exchange resin composition to react with active reaction sites (aromatic rings and the like) of other additive (including resins) components to thereby form fine crosslinking through the reaction (particularly the reaction of ion-exchange groups present near the other resin components being dispersed additives) and contribute to the stabilization. The degree of the crosslinking is, in terms of EW (the degree of the EW decrease before and after the heat treatment), preferably 0.001 to 5%, more preferably 0.1 to 3%, and still more preferably about 0.2 to 2%.

Since making the treatment conditions equal to or below the upper limits of the above treatment conditions (time, temperature) suppresses the generation of fluorine removal, hydrofluoric acid removal, sulfonic acid removal and thermally oxidized sites, and the like, and suppresses faults in the molecular structure originated therefrom, the oxidative deterioration resistance of an electrolyte membrane is likely to be improved. By contrast, making those equal to or above the treatment conditions is likely to make sufficient the above-mentioned effect of the treatment.

The electrolyte membranes in the present embodiment are excellent in the ion permselectivity, low in the electric resistance, and excellent also in the durability (mainly the hydroxy radical oxidation resistance), and exhibit excellent performance as a separation membrane for a redox flow secondary battery. Here, each physical property in the present specification can be measured according to methods described in the following Examples unless otherwise specified.

EXAMPLES

Then, the present embodiments will be described more specifically by way of Examples and Comparative Examples, but the present embodiments are not limited to the following Examples unless going over their gist.

[Measurement Methods]

(1) The Melt Flow Index of a PFSA Resin Precursor

The melt flow index was measured according to ASTM: D1238 under the measurement conditions of a temperature of 270° C. and a load of 2,160 g.

(2) The Measurement of an Equivalent Weight EW of a PFSA Resin 0.3 g of a PFSA resin was immersed in 30 mL of a saturated NaCl aqueous solution at 25° C., and left for 30 min under stirring. Then, free protons in the saturated NaCl aqueous solution was subjected to a neutralization titration using a 0.01 N sodium hydroxide aqueous solution with phenolphthalein as an indicator. The end point of the neutralization titration was set at a pH of 7; and the PFSA resin content, obtained after the neutralization titration, in which counter ions of ion-exchange groups were in the sodium ion state was rinsed with pure water, further dried in a pan drier at 160° C., and weighed. The amount of substance of sodium hydroxide used for the neutralization was taken as M (mmol), and the mass of the PFSA resin in which counter ions of the ion-exchange groups were in the sodium ion state was taken as W (mg); and the equivalent weight EW (g/eq) was determined from the following expression.

$$EW=(W/M)-22$$

The above operation was repeated five times; and the maximum value and the minimum value of the five calculated EW values were excluded, and the three values were arithmetically averaged to thereby make a measurement result.

(3) Measurement of the Ionic Conductivity

The measurement was carried out as follows using a polymer membrane moisture amount tester MSB-AD-V-FC, made by BEL Japan, Inc.

A polyelectrolyte membrane formed as a membrane of 50 μm in thickness was cut out in a width of 1 cm and a length of 3 cm, and set in a conductivity measurement cell. Then, the conductivity measurement cell was set in a chamber of the above tester; and the interior of the chamber was regulated at 110° C. at less than 1% RH. Then, steam formed using ion-exchange water was introduced in the chamber; and the ionic conductivity at each of the above humidities was measured while the interior of the chamber was being humidified at 50% RH.

(4) The Measurement of an Equilibrium Moisture Content

A dispersion liquid of a PFSA resin was coated on a clear glass plate, dried at 150° C. for about 10 min, and peeled to thereby form a membrane of about 30 μm; the membrane was left in water at 23° C. for about 3 hours, and thereafter left in a room of a relative humidity (RH) of 50% for 24 hours; and then, the equilibrium moisture content was measured. An 80° C.-vacuum-dried membrane was used as the reference dried membrane. The equilibrium moisture content was calculated from the mass variation in the membrane.

(5) Charge and Discharge Test

In a redox flow secondary battery, each of liquid-permeable porous current collector electrodes (for a negative electrode and for a positive electrode) was disposed on either side of the separation membrane, and these were held by pressing; one side partitioned by the separation membrane was made a positive electrode cell chamber and the other side was made a negative electrode cell chamber; and the thicknesses of both the cell chambers were secured by spacers. Charge and discharge of the battery was carried out by circulating a positive electrode electrolyte solution composed of a sulfuric acid electrolyte solution comprising tetravalent vanadium ($V^{4+}$) and pentavalent vanadium ($V^{5+}$) to the positive electrode cell chamber, and circulating a negative electrode electrolyte solution comprising trivalent vanadium ($V^{3+}$) and divalent vanadium ($V^{2+}$) to the negative electrode cell chamber. In the charge time therein, in the positive electrode cell chamber, vanadium ions released electrons to thereby oxidize $V^{4+}$ to $V^{5+}$; and in the negative electrode cell chamber, electrons having returned through an external circuit reduced $V^{3+}$ to $V^{2+}$. In the oxidation and reduction reactions, in the positive electrode cell chamber, protons ($H^+$) became excessive; by contrast, in the negative electrode cell chamber, protons ($H^+$) became insufficient. The excessive protons in the positive electrode cell chamber selectively migrated to the negative electrode chamber through the separation membrane to thereby hold the electric neutrality. In the discharge time, a reaction reverse thereto progressed.

The battery efficiency (energy efficiency) at this time is represented by a ratio (%) obtained by dividing a discharge electric energy by a charge electric energy; and both the electric energies depend on the internal resistance of the battery cells, the ion permselectivity of the separation membrane, and the current losses of others.

The current efficiency (%) is represented by a ratio (%) obtained by dividing an amount of discharge electricity by an amount of charge electricity; and both the amounts of electricity depend on the ion permselectivity of the separation membrane and current losses of others. The battery efficiency is represented by a product of the current efficiency and a voltage efficiency. Since the reduction of the internal resistance, that is, cell electric resistivity, improves the voltage efficiency and the improvement of the ion permselectivity and the reduction of the current losses of others improve the current efficiency, these factors become important indices in the redox flow secondary battery.

A charge and discharge test was carried out using a battery thus obtained. An aqueous electrolyte solution having a whole vanadium concentration of 2 M/L and a whole sulfate concentration of 4 M/L was used; the thicknesses of the positive electrode cell chamber and the negative electrode cell chamber installed were each 5 mm; and a porous felt of 5 mm in thickness and about 0.1 g/cm³ in bulk density composed of a carbon fiber was interposed between the separation membrane and each of both the porous electrodes. The charge and discharge test was carried out at a current density of 80 mA/cm².

The cell electric resistivity was determined by using the AC impedance method, and measuring a direct-current resistance value at an AC voltage of 10 mV at a frequency of 20 kHz at the discharge initiation time and multiplying the resistance value by the electrode area.

Examples 1 to 6

(1) Fabrication of a PFSA Resin Precursor

A 10% aqueous solution of $C_7F_{15}COONH_4$ and pure water were charged in a stainless steel-made stirring-type autoclave, and the interior atmosphere of the autoclave was sufficiently vacuum and replaced by nitrogen; and thereafter, tetrafluoroethylene ($CF_2=CF_2$) gas was introduced, and the interior pressure was pressurized to 0.7 MPa in terms of gage pressure. Then, an ammonium persulfuric acid aqueous solution was injected to initiate the polymerization. While in order to supply TFE consumed by the polymerization, TFE gas was continuously fed so as to hold the pressure of the autoclave at 0.7 MPa, $CF_2=CFO(CF_2)_2-SO_2F$ of an amount corresponding to 0.70 times the amount of TFE fed in mass ratio was continuously fed to carry out the polymerization by regulating the polymerization condition in a best range respectively to thereby obtain various types of a perfluorocarbonsulfonic acid resin precursor powder. MFIs of the obtained PFSA resin precursor powders were 1.0 (g/10 min) for A1, 0.5 (g/10 min) for A2, 1.5 (g/10 min) for A3, 1.5 (g/10 min) for A4, 1.8 (g/10 min) for A5, and 2.0 (g/10 min) for A6.

(2) Fabrication of Perfluorocarbonsulfonic Acid Resins and Dispersion Solutions Thereof The obtained PFSA resin precursor powder was brought into contact with an aqueous solution in which potassium hydroxide (15% by mass) and methyl alcohol (50% by mass) were dissolved at 80° C. for 20 hours to thereby subject the precursor polymer to a hydrolysis treatment. Thereafter, the precursor polymer was immersed in water at 60° C. for 5 hours. Then, such a treatment that the resultant was immersed in a 2 N hydrochloric acid aqueous solution at 60° C. for 1 hour was repeated five times by renewing the hydrochloric acid aqueous solution each time; and thereafter, the resultant was washed with ion-exchange water, and dried. A PFSA resin having a structure having sulfonic acid groups ($SO_3H$) and represented by the formula (1) was thereby obtained. The EW of the obtained PFSA resin: A1 was 527 (g/eq), A2 was 578 (g/eq), A3 was 650 (g/eq), A4 was 910 (g/eq), A5 was 1100 (g/eq), and A6 was 1500 (g/eq), respectively.

The obtained PFSA resins were each put in a 5-L autoclave together with an ethanol aqueous solution (water:ethanol=50:50 (in mass ratio)), and the autoclave was hermetically closed; and the mixture was heated up to 160° C. under stirring by a blade, and the temperature was held for 5 hours. Thereafter, the autoclave was spontaneously cooled, and a homogeneous dispersion liquid of 5% by mass of the PFSA resin was thus fabricated. Then, 100 g of pure water was added to 100 g of the PFSA resin dispersion liquid, and stirred; and thereafter while the dispersion liquid was heated to 80° C. and stirred, the dispersion liquid was concentrated up to 20% by mass in terms of solid content concentration.

The PFSA resin dispersion liquids obtained were named dispersion liquid (ASF1), dispersion liquid (ASF2), dispersion liquid (ASF3), dispersion liquid (ASF4), dispersion liquid (ASF5), and dispersion liquid (ASF6), respectively, in the order same as above.

(3) Fabrication of an Electrolyte Membrane

The obtained dispersion liquid (ASF1 to ASF6) was cast on a polyimide film as a carrier sheet by a well-known usual method, exposed to hot air at 120° C. (for 20 min) to nearly completely evaporate the solvent and dry to thereby obtain a membrane. The membrane was further subjected to a heat treatment in a hot air atmosphere under the condition of 160° C. for 10 min to thereby obtain an electrolyte membrane of 50 μm in membrane thickness. The variation rate of EWs before and after the heat treatment of the obtained electrolyte membrane was about 0.2 to 0.3%.

The equilibrium moisture content of the obtained electrolyte membrane were ASF1 (23% by mass), ASF2 (19% by mass), ASF3 (12% by mass), ASF4 (12% by mass), ASF5 (11% by mass) and ASF6 (9% by mass).

Each maximum moisture content of the electrolyte membrane in water at 25° C. for 3 hours was ASF1 (50% by mass), ASF2 (27% by mass), ASF3 (23% by mass), ASF4 (23% by mass), ASF5 (20% by mass), and ASF6 (18% by mass), respectively. Here, the maximum moisture content is a maximum value observed in the equilibrium moisture content measurement.

The ionic conductivities of the electrolyte membranes were ASF1 (0.14 S/cm), ASF2 (0.12 S/cm), ASF3 (0.1 S/cm), ASF4 (0.06 S/cm), ASF5 (0.06 S/cm), and ASF6 (0.05 S/cm).

Then, a charge and discharge test was carried out using each electrolyte membrane as a separation membrane of a vanadium redox flow secondary battery. The charge and discharge experiments of ASF1 to ASF6 were carried out after the equilibrium was sufficiently reached in the electrolyte solutions; and thereafter, after the stable state was made, the cell electric resistivities and the current efficiencies were measured. The current efficiency/the cell electric resistivity of the respective membranes was ASF1 (98.5/0.65), ASF2 (98.0/0.70), ASF3 (97.5/0.90), ASF4 (96.5/0.90), ASF5 (96.0/0.95), and ASF6 (95.5/1.05), in which Examples 1 to 3 exhibited especially excellent tendencies.

Example 7

An electrolyte membrane was obtained as in Example 1, except for using a mixed dispersion liquid obtained by mixing the PFSA resin dispersion liquid (ASF3) and Nafion DE2021 (made by Du Pont K.K., 20% solution, EW: 1,050) in 50:50 (in mass ratio) in place of the 20% PFSA resin dispersion liquid (ASF1) used in Example 1. The equilibrium moisture content of the membrane was 12% by mass.

The ionic conductivity of the obtained electrolyte membrane was measured by the similar method as in the Examples, and was 0.06 S/cm. The charge and discharge test was carried out by the similar method as in Example 1, and as a result, the current efficiency (%)/the cell electric resistivity ($\Omega \cdot cm^2$) was 96.0/0.95.

Example 8

An electrolyte membrane was obtained as in Example 1, except for using a mixed dispersion liquid obtained by mixing the PFSA resin dispersion liquid (ASF3) and Nafion DE2021 (made by Du Pont K.K., 20% solution, EW: 1,050) in 10:90 (in mass ratio) in place of the 20% PFSA resin dispersion liquid (ASF1) used in Example 1. The equilibrium moisture content of the membrane was 10% by mass.

The ionic conductivity of the obtained electrolyte membrane was measured by the similar method as in the Examples, and was 0.05 S/cm. As a result of carrying out a charge and discharge test by the similar method as in Example 1, the current efficiency (%)/the cell electric resistivity ($\Omega \cdot cm^2$) was 95.5/1.00 for either.

Example 9

A polyphenylene sulfide powder (made by Chevron Phillips Chemical Co. LP, type No. P-4) dispersed in an alkali aqueous solution (KOH-10% aqueous solution) was homogeneously mixed and dispersed under stirring in the PFSA resin dispersion liquid (ASF3) so that the powder was finally 5 parts by mass with respect to 100 parts by mass of the PFSA resin component in terms of solid component. Then, the resultant was passed through a column packed with a particulate cation-exchange resin particle to thereby nearly completely remove alkali ion components, to thereby make a PFSA dispersion liquid (ASF7).

The obtained PFSA resin dispersion liquid (ASF7) was cast on a polyimide film as a carrier sheet by a well-known usual method, exposed to hot air at 120° C. (for 20 min) to nearly completely evaporate the solvent and dry to thereby obtain a membrane. The membrane was further subjected to a heat treatment in a hot air atmosphere under the condition of 160° C. for 10 min to thereby obtain an electrolyte membrane of 50 μm in membrane thickness. The variation rate of EWs before and after the heat treatment of the obtained electrolyte membrane was about 0.2 to 0.3%. The equilibrium moisture content of the obtained electrolyte membrane was 12% by mass. The maximum moisture content of the electrolyte membrane in water at 25° C. for 3 hours was 18% by mass. As a result of carrying out a charge and discharge test by the similar method as in Example 1, the current efficiency (%)/the cell electric resistivity ($\Omega \cdot cm^2$) was 98.5/0.97.

Comparative Example 1

An electrolyte membrane was obtained as in Example 1, except for using Nafion DE2021 (made by Du Pont K.K., 20% solution, EW: 1,050) in place of the 20% PFSA resin dispersion liquid (ASF1) used in Example 1. The equilibrium moisture content of the membrane was 6% by mass.

The ionic conductivity of the obtained electrolyte membrane was measured by the similar method as in the Examples, and was 0.04 S/cm, in which the ionic conductivity was low and inferior to the membranes of the Examples. The charge and discharge test was carried out by the similar method as in the Examples, and as a result, the current efficiency (%)/the cell electric resistivity ($\Omega \cdot cm^2$) was 94.5/1.20, in which the current efficiency also was in a considerably lower level than in the Examples.

Comparative Example 2

As a result of carrying out a charge and discharge test by using Nafion 112 (membrane thickness: 50 μm) by the similar method as in Example 1, the current efficiency (%)/the cell electric resistivity ($\Omega \cdot cm^2$) was 94.0/1.20.

In Table 1, the results of the above Examples 1 to 9 and Comparative Examples 1 to 2 are shown.

TABLE 1

| | Polyelectrolyte Polymer | | | | Polyelectrolyte Membrane | |
| | | | | | Ion-exchange | |
| | Polymer Name | MFI (g/10 min) | Equivalent Weight (g/eq) | Additive Kind | Resin Composition Name | Membrane Thickness (μm) |
| --- | --- | --- | --- | --- | --- | --- |
| Example 1 | A1 | 1.0 | 527 | — | ASF1 | 50 |
| Example 2 | A2 | 0.5 | 578 | — | ASF2 | 50 |
| Example 3 | A3 | 1.5 | 650 | — | ASF3 | 50 |
| Example 4 | A4 | 1.5 | 910 | — | ASF4 | 50 |
| Example 5 | A5 | 1.8 | 1100 | — | ASF5 | 50 |
| Example 6 | A6 | 2.0 | 1500 | — | ASF6 | 50 |
| Example 7 | A3/Nafion DE2021 = 50/50 | 1.5 | 650 | — | — | 50 |
| Example 8 | A3/Nafion DE2021 = 10/90 | 1.5 | 650 | — | — | 50 |
| Example 9 | A3 | 1.5 | 650 | PPS | ASF7 | 50 |
| Comparative Example 1 | Nafion DE2021 | — | — | — | — | 50 |
| Comparative Example 2 | — | — | — | — | Nafion112 | 50 |

| | Polyelectrolyte Membrane | | | Charge and Discharge Test of Redox Flow Battery | |
| | Membrane Ionic Conductivity (100° C.50% RH) (S/cm) | Membrane Equilibrium Moisture Content (mass %) | Membrane Maximum Moisture Content (25° C.) (mass %) | Membrane Thickness (μm) | Current Efficiency (%) (initial) | Cell Electric Resistivity ($\Omega \cdot cm^2$) (initial) |
| --- | --- | --- | --- | --- | --- | --- |
| Example 1 | 0.14 | 23 | 50 | 50 | 98.5 | 0.65 |
| Example 2 | 0.12 | 19 | 27 | 50 | 98.0 | 0.70 |
| Example 3 | 0.10 | 12 | 23 | 50 | 97.5 | 0.90 |
| Example 4 | 0.06 | 12 | 23 | 50 | 96.5 | 0.90 |
| Example 5 | 0.06 | 11 | 20 | 50 | 96.0 | 0.95 |
| Example 6 | 0.05 | 9 | 18 | 50 | 95.5 | 1.05 |
| Example 7 | 0.06 | 12 | — | 50 | 96.0 | 0.95 |
| Example 8 | 0.05 | 10 | — | 50 | 95.5 | 1.00 |
| Example 9 | 0.08 | 12 | 18 | 50 | 98.5 | 0.97 |
| Comparative Example 1 | 0.04 | 6 | — | 50 | 94.5 | 1.20 |
| Comparative Example 2 | 0.04 | — | — | 50 | 94.0 | 1.20 |

The present application is based on Japanese Patent Application (Japanese Patent Application No. 2011-290033), filed on Nov. 28, 2011 in the Japan Patent Office, the entire content of which are hereby incorporated by reference.

INDUSTRIAL APPLICABILITY

The electrolyte membrane according to the present invention is excellent in the ion permselectivity, low in the electric resistance, and excellent in the durability (mainly hydroxy radical oxidation resistance) as well, and is industrially applicable as a separation membrane for a redox flow secondary battery.

REFERENCE SIGNS LIST

1 POSITIVE ELECTRODE
2 POSITIVE ELECTRODE CELL CHAMBER
3 NEGATIVE ELECTRODE
4 NEGATIVE ELECTRODE CELL CHAMBER
5 ELECTROLYTE MEMBRANE
6 ELECTROLYTIC BATH
7 POSITIVE ELECTRODE ELECTROLYTE SOLUTION TANK
8 NEGATIVE ELECTRODE ELECTROLYTE SOLUTION TANK
9 AC/DC CONVERTER
10 REDOX FLOW SECONDARY BATTERY

The invention claimed is:

1. A redox flow secondary battery comprising an electrolytic bath comprising:
   a positive electrode cell chamber comprising a positive electrode composed of a carbon electrode;
   a negative electrode cell chamber comprising a negative electrode composed of a carbon electrode; and
   an electrolyte membrane as a diaphragm to separate the positive electrode cell chamber and the negative electrode cell chamber,
   wherein the positive electrode cell chamber comprises a positive electrode electrolyte solution comprising a positive electrode active substance; and the negative electrode cell chamber comprises a negative electrode electrolyte solution comprising a negative electrode active substance;
   wherein the redox flow secondary battery charges and discharges based on changes in valences of the positive electrode active substance and the negative electrode active substance in the electrolyte solutions;
   wherein the electrolyte membrane comprises an ion-exchange resin composition comprising a perfluorocarbonsulfonic acid resin having a structure represented by the following formula (1):

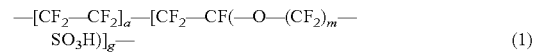

wherein a and g represent numbers satisfying $0 \leq a < 1$, $0 < g \leq 1$, and $a+g=1$; and m represents an integer of 1 to 6;
   wherein the perfluorocarbonsulfonic acid resin has an equivalent weight EW (a dry mass in grams per equivalent of ion-exchange groups) of 250 to 1,500 g/eq; and
   wherein the electrolyte membrane has an ionic conductivity at 110° C. at a relative humidity of 50% RH of 0.05 S/cm or higher, and
   wherein the electrolyte membrane does not comprise a reinforcing material.

2. The redox flow secondary battery according to claim 1, wherein the perfluorocarbonsulfonic acid resin has an equivalent weight EW (a dry mass in grams per equivalent of ion-exchange groups) of 250 to 700 g/eq.

3. The redox flow secondary battery according to claim 1, wherein the positive electrode electrolyte solution and the negative electrode electrolyte solution are sulfuric acid electrolyte solutions comprising vanadium.

4. The redox flow secondary battery according to claim 1, wherein the electrolyte membrane has an equilibrium moisture content of 5 to 80% by mass.

5. The redox flow secondary battery according to claim 2, wherein the electrolyte membrane has an equilibrium moisture content of 5 to 80% by mass.

6. The redox flow secondary battery according to claim 1, wherein the ion-exchange resin composition comprises 0.1 to 20 parts by mass of a polyphenylene ether resin and/or a polyphenylene sulfide resin with respect to 100 parts by mass of the perfluorocarbonsulfonic acid resin.

7. The redox flow secondary battery according to claim 2, wherein the ion-exchange resin composition comprises 0.1 to 20 parts by mass of a polyphenylene ether resin and/or a polyphenylene sulfide resin with respect to 100 parts by mass of the perfluorocarbonsulfonic acid resin.

* * * * *